United States Patent
Jeon

(10) Patent No.: US 12,545,082 B2
(45) Date of Patent: Feb. 10, 2026

(54) COMPLEX HEAT EXCHANGER

(71) Applicant: Hanon Systems, Daejeon (KR)

(72) Inventor: Young-Ha Jeon, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 154 days.

(21) Appl. No.: 18/282,273

(22) PCT Filed: Jun. 2, 2022

(86) PCT No.: PCT/KR2022/007831
§ 371 (c)(1),
(2) Date: Sep. 15, 2023

(87) PCT Pub. No.: WO2022/255812
PCT Pub. Date: Dec. 8, 2022

(65) Prior Publication Data
US 2024/0157766 A1    May 16, 2024

(30) Foreign Application Priority Data

Jun. 2, 2021   (KR) .................. 10-2021-0071391

(51) Int. Cl.
*F28F 27/00* (2006.01)
*B60H 1/00* (2006.01)
(Continued)

(52) U.S. Cl.
CPC ......... *B60H 1/323* (2013.01); *B60H 1/00328* (2013.01); *B60H 1/00335* (2013.01);
(Continued)

(58) Field of Classification Search
CPC .................. B60H 1/323; B60H 1/00328; B60H 1/00335; B60H 1/00342;
(Continued)

(56) References Cited

U.S. PATENT DOCUMENTS

| 10,088,241 B1* | 10/2018 | Meissner ............... F24F 1/04 |
| 2012/0241139 A1* | 9/2012 | Katoh ............... B60H 1/00042 |
| | | 165/104.19 |
| 2022/0134845 A1* | 5/2022 | Keon ............... F28F 1/126 |
| | | 62/150 |

FOREIGN PATENT DOCUMENTS

| JP | 57-084107 | 5/1982 |
| JP | U11982084107 | 5/1982 |

(Continued)

OTHER PUBLICATIONS

International Search Report issued in PCT/KR2022/007831 on Sep. 6, 2022.
(Continued)

*Primary Examiner* — Marc E Norman
(74) *Attorney, Agent, or Firm* — NORTON ROSE FULBRIGHT US LLP

(57) ABSTRACT

A complex heat exchanger capable of working in different air conditioning modes by controlling flow of coolant in a refrigerant-coolant secondary loop system linked with a primary loop of refrigerant circulation. The heat exchanger is capable to perform heating or cooling operation with the flowing coolant being heated or cooled by the refrigerant, while two heat exchanger cores are disposed in parallel, and a path regulating manifold is provided to connect inlet and discharge ports to allow the coolant to flow sequentially or independently through two heat exchangers. In cooling or heating mode, coolant flows sequentially through two heat exchangers to maximize the heat exchange efficiency. In a dehumidifying mode, the low-temperature coolant and the high-temperature coolant respectively flow through the two heat exchangers independently to smoothly implement the dehumidification. Therefore, the single complex heat exchanger can perform the heating, cooling, and dehumidifying operations with maximum efficiency.

13 Claims, 11 Drawing Sheets

(51) Int. Cl.
*B60H 1/32* (2006.01)
*F28D 1/04* (2006.01)
*F28D 1/053* (2006.01)
*F28F 9/02* (2006.01)
*F28F 9/20* (2006.01)
*F28D 21/00* (2006.01)

(52) U.S. Cl.
CPC ........... *B60H 1/00342* (2013.01); *F28D 1/04* (2013.01); *F28D 1/0408* (2013.01); *F28D 1/0417* (2013.01); *F28D 1/0435* (2013.01); *F28D 1/05366* (2013.01); *F28F 9/0253* (2013.01); *F28F 9/20* (2013.01); *F28F 27/00* (2013.01); *B60H 2001/00307* (2013.01); *B60H 2001/00928* (2013.01); *F28D 2021/0091* (2013.01)

(58) Field of Classification Search
CPC ........... B60H 2001/00307; B60H 2001/00928; F28D 1/04; F28D 1/0408; F28D 1/0417; F28D 1/0435; F28D 1/05366; F28F 9/0253; F28F 9/20; F28F 9/26; F28F 27/00
See application file for complete search history.

(56) References Cited

FOREIGN PATENT DOCUMENTS

| | | |
|---|---|---|
| JP | 03-084395 | 4/1991 |
| JP | 2001108391 | 4/2001 |
| JP | 2004156867 | 6/2004 |
| JP | 2013137182 | 7/2013 |
| JP | 2014228240 | 12/2014 |
| JP | 2018035802 A | 3/2018 |
| JP | 2020100256 | 7/2020 |
| KR | 100737160 B1 | 7/2007 |
| KR | 20190053654 A | 5/2019 |
| KR | 20190124931 A | 11/2019 |
| KR | 20210002848 A | 1/2021 |
| WO | 2006112540 A1 | 10/2006 |

OTHER PUBLICATIONS

Official Action issued Dec. 24, 2024 in related Japanese Patent Application No. 2023572783, 5 pgs.
Official Action issued Jul. 15, 2025 in related Korean Patent Application No. 10-2021-0071391, 7 pgs.

* cited by examiner

COMPLEX HEAT EXCHANGER

CROSS REFERENCE TO RELATED APPLICATIONS

This patent application is a national phase under 35 U.S.C. § 371 of International Patent Application No. PCT/KR2022/007831 filed Jun. 2, 2022, which claims the benefit of priority from Korean Patent Application No. 10-2021-0071391 filed Jun. 2, 2021, each of which is hereby incorporated herein by reference in its entirety for all purposes.

TECHNICAL FIELD

The present invention relates to a complex heat exchanger, and more particularly, to a complex heat exchanger capable of implementing various air conditioning modes by controlling a flow of a coolant in a refrigerant-coolant secondary loop system.

BACKGROUND ART

In general, not only components such as an engine for operating a vehicle are provided in an engine room of the vehicle, but also various heat exchangers such as a radiator, an intercooler, an evaporator, and a condenser for cooling the components such as the engine in the vehicle or adjusting an air temperature in an interior of the vehicle are provided in the engine room of the vehicle. In general, heat exchange media flow in the heat exchangers. The heat exchange medium in the heat exchanger exchanges heat with outside air present outside the heat exchanger, such that the cooling operation or the heat dissipation is performed. Various heat exchange media, such as a coolant for cooling components in the vehicle or a refrigerant for adjusting an air temperature, flow in the heat exchangers.

An air conditioning system for adjusting an air temperature in a vehicle interior is basically configured such that a compressor, a condenser, an expansion valve, and an evaporator are connected to constitute one loop, and a refrigerant circulates. In this case, the air cooled by the evaporator is blown into the vehicle interior, such that the vehicle interior is cooled. Because this system directly performs the cooling operation, this system is called a direct cooling system or a primary loop.

Meanwhile, the refrigerant, which flows through the primary loop, has a significant amount of thermal energy. Therefore, the refrigerant is used to exchange heat with a separate heat exchange medium (e.g., coolant), such that the primary loop is linked with another cooling system. The system linked with the primary loop is called a secondary loop. FIG. 1 is a view illustrating an embodiment of an air conditioning system having primary and secondary loops, a refrigerant circulates through a left primary loop including a compressor, a condenser, an expansion valve, and a chiller, and a coolant circulates through a right secondary loop including a pump, a chiller, and a cooler. In the embodiment in FIG. 1, the coolant is cooled as the refrigerant exchanges heat with the coolant in the chiller, and the low-temperature coolant cools ambient air while passing through the cooler, such that the interior is cooled. This system is clearly disclosed in Korean Patent Laid-Open No. 2019-0124931 ("Heat Exchange System for Vehicle", Nov. 6, 2019).

The embodiment in FIG. 1 is just a very simple example, and the secondary loop is used to perform only the cooling operation. However, the actual system using the primary and secondary loops may have a more complicated configuration and implement various air conditioning modes such as cooling, heating, and dehumidifying modes by using a flow of the refrigerant or coolant. FIG. 2 illustrates another embodiment of an air conditioning system having primary and secondary loops. In FIG. 2, the dark line indicates a primary loop that is a path through which a refrigerant passes, and the light line indicates a secondary loop that is a path through which a coolant passes. FIGS. 3A to 3C are views illustrating refrigerant and coolant paths when the air conditioning system in FIG. 2 performs cooling, heating, and dehumidifying operations. Heat exchangers used for the air conditioning operation are first and second heat exchangers denoted by ① and ② in FIGS. 3A to 3C. As illustrated in FIG. 3A, in a cooling mode, the low-temperature coolant, which is cooled by exchanging heat with a water-cooled evaporator, passes through the first and second heat exchangers ① and ②, such that low-temperature air is blown into a vehicle interior, and the vehicle interior is cooled. As illustrated in FIG. 3B, in a heating mode, the high-temperature coolant, which is heated by exchanging heat with a water-cooled condenser, passes through the first and second heat exchangers ① and ②, such that high-temperature air is blown into the vehicle interior, and the vehicle interior is heated. As illustrated in FIG. 3C, in a dehumidification mode, the low-temperature coolant, which is cooled by exchanging heat with the water-cooled evaporator, performs a dehumidifying operation by condensing moisture in the air while passing through the first heat exchange part ①, and the high-temperature coolant, which is heated by exchanging heat with the water-cooled condenser, appropriately heats the air, which is dehumidified and cooled while passing through the second heat exchange part ②, to allow the air to have a medium temperature. Therefore, the dehumidified medium-temperature air is blown into the vehicle interior, such that the vehicle interior is dehumidified. As can be seen from FIGS. 3A to 3C, the system in FIG. 2 may implement various air conditioning modes such as heating, cooling, and dehumidifying modes by appropriately adjusting only the flow of the coolant in the secondary loop by using a valve while maintaining the flow of the refrigerant in the primary loop without change.

However, the system in FIG. 2 has limitations as follows. First, as clearly illustrated in FIG. 2, the first and second heat exchangers ① and ② are respectively implemented as separate heat exchangers, which restricts the miniaturization of an air conditioning module package. In addition, with reference to FIGS. 3A and 3B, in case that both the first and second heat exchangers ① and ② are used to perform the heating or cooling operation, the coolant is supplied to the two heat exchangers in parallel, which limits the improvement on heat exchange performance. That is, the air is allowed to sequentially pass through the first and second heat exchangers ① and ② by an air blower, and the first and second heat exchangers ① and ② have almost the same temperature when the coolant is supplied to the first and second heat exchangers ① and ② disposed in parallel. In this case, for example, in the cooling mode, because the air has already been cooled while passing through the first heat exchange part ①, the air is not greatly different in temperature from the coolant flowing through the second heat exchange part ②. For this reason, the air does not actively perform the heat exchange while passing through the second heat exchange part ②. Likewise, even in the heating mode, it is difficult to substantially greatly improve the cooling or heating effect in the second heat exchange part ②.

DOCUMENT OF RELATED ART

Patent Document: Korean Patent Laid-Open No. 2019-0124931 ("Heat Exchange System for Vehicle", Nov. 6, 2019)

DISCLOSURE

Technical Problem

Accordingly, the present invention has been made in an effort to solve the above-mentioned problem in the related art, and an object of the present invention is to provide a complex heat exchanger, which is provided in a secondary loop linked with a primary loop through which a refrigerant circulates, the complex heat exchanger being configured to perform a heating or cooling operation as a coolant flowing in the complex heat exchanger is heated or cooled by the refrigerant, in which two heat exchanger cores are disposed in parallel, and a path regulating manifold is provided to appropriately and selectively connect inlet and discharge ports to allow the coolant to flow sequentially or independently through two heat exchangers. Therefore, in a cooling or heating mode, the coolant flows sequentially through the two heat exchangers (i.e., to exhibit an effect obtained when the two heat exchangers are connected in series) to maximize the heat exchange efficiency. In a dehumidifying mode, the low-temperature coolant and the high-temperature coolant respectively flow through the two heat exchangers independently to smoothly implement the dehumidification. Therefore, the single complex heat exchanger may perform the heating, cooling, and dehumidifying operations with maximum efficiency.

Technical Solution

To achieve the above-mentioned object, the present invention provides a complex heat exchanger 100, which is provided in a secondary loop linked with a primary loop including a compressor, a condenser, an expansion valve, and an evaporator and configured such that a refrigerant circulates therethrough, the secondary loop being configured such that a coolant, which exchanges heat with the refrigerant, circulates therethrough, the complex heat exchanger 100 being configured to perform at least one air conditioning mode selected from cooling, heating, and dehumidifying modes by allowing a high-temperature coolant or a low-temperature coolant to exchange heat with outside air, in which when a direction in which outside air is blown inward is a forward direction and a direction in which outside air is blown outward is a rearward direction, a plurality of flow ports provided on a first heat exchange part 110 and a plurality of flow ports provided on a second heat exchange part 120 disposed rearward of the first heat exchange part 110 are connected to one another, such that the coolant flows sequentially through the first heat exchange part 110 and the second heat exchange part 120 or the coolant flows independently through the first heat exchange part 110 and the second heat exchange part 120 in accordance with introduction and discharge positions of the high-temperature and low-temperature coolants. In this case, in the complex heat exchanger 100, the introduction and discharge positions of the high-temperature and low-temperature coolants in the complex heat exchanger 100 may be determined by external valve adjustment.

More specifically, the first heat exchange part 110 may include: a pair of first tanks 111 having coolant flow spaces therein, disposed side by side, and spaced apart from each other at a predetermined distance; a plurality of first tubes 112 each having two opposite ends fixed to the first tanks 111 to define coolant flow paths; one side first flow port 113 provided in one first tank 111 and configured to allow the coolant to flow; and the other side first flow port 114 provided in the other first tank 111 and configured to allow the coolant to flow. In addition, the second heat exchange part 110 may include: a pair of second tanks 121 having coolant flow spaces therein, disposed side by side, and spaced apart from each other at a predetermined distance; a plurality of second tubes 122 each having two opposite ends fixed to the second tanks 121 to define coolant flow paths; one side second flow port 123 provided in one second tank 121 and configured to allow the coolant to flow; and the other side second flow port 124 provided in the other second tank 121 and configured to allow the coolant to flow.

In this case, the complex heat exchanger 100 may include: the first heat exchange part 110; the second heat exchange part 120; one side manifold 130 including a first communication port 131 connected to one side first flow port 113, a first flow path 1 configured to communicate with the first communication port, a second communication port 132 connected to one side second flow port 123, a second flow path 2 configured to communicate with the second communication port 132, one side manifold 130 being configured to connect one side first flow port 113 and one side second flow port 123; the other side manifold 140 including a third communication port 143 connected to the other side first flow port 114, a third flow path 3 configured to communicate with the third communication port 143, a fourth communication port 144 connected to the other side second flow port 124, and a fourth flow path 4 configured to communicate with the fourth communication port 144, the other side manifold 140 being configured to connect the other side first flow port 114 and the other side second flow port 124.

In this case, in a cooling mode of the complex heat exchanger 100, the low-temperature coolant may sequentially pass through the first flow path 1, the first communication port 131, one side first flow port 113, the first heat exchange part 110, the fourth communication port 144, the other side first flow port 114, the fourth flow path 4, the third flow path 3, the third communication port 143, the other side second flow port 124, the second heat exchange part 120, one side second flow port 123, the second communication port 132, and the second flow path 2, such that the low-temperature coolant sequentially flows through the first heat exchange part 110 and the second heat exchange part 120.

In addition, in a heating mode of the complex heat exchanger 100, the high-temperature coolant may sequentially pass through the third flow path 3, the third communication port 143, the other side second flow port 124, the second heat exchange part, one side second flow port 123, the second communication port 132, the second flow path 2, the first flow path 1, the first communication port 131, one side first flow port 113, the first heat exchange part 110, the fourth communication port 144, the other side first flow port 114, and the fourth flow path 4, such that the high-temperature coolant sequentially flows through the second heat exchange part 120 and the first heat exchange part 110.

Alternatively, in a heating mode of the complex heat exchanger 100, the high-temperature coolant may sequentially pass through the third flow path 3, the third communication port 143, the other side second flow port 124, the second heat exchange part, one side second flow port 123, the second communication port 132, and the second flow path 2, such that the high-temperature coolant flows only through the second heat exchange part 120.

In addition, in a dehumidifying mode of the complex heat exchanger 100, the low-temperature coolant may sequentially pass through the first flow path 1, the first communication port 131, one side first flow port 113, the first heat exchange part 110, the fourth communication port 144, the other side first flow port 114, and the fourth flow path 4, and the high-temperature coolant may sequentially pass through the third flow path 3, the third communication port 143, the other side second flow port 124, the second heat exchange part, one side second flow port 123, the second communication port 132, and the second flow path 2, such that the low-temperature coolant flows only through the first heat exchange part 110, and the high-temperature coolant flows only through the second heat exchange part 120.

In addition, the complex heat exchanger 100 may include supports 101 each configured such that a part of a front side thereof is disposed at an end of a tube row defined by the plurality of first tubes 112, and a part of a rear side thereof is disposed at an end of the tube row defined by the plurality of first tubes 112, such that the supports 101 are disposed at two opposite ends of the tube row and connect the first tank 111 and the second tank 112.

In addition, the complex heat exchanger 100 may include a connection member 102 configured to connect the first and second tanks 111 and 121, which are disposed side by side, so that the first and second tanks 111 and 121 are integrated. In this case, the connection member 102 may have a plurality of notches disposed in an arrangement direction of the tube row, or the connection member 102 may be provided in the form of a plurality of bars separated from one another and disposed in the arrangement direction of the tube row.

In addition, the complex heat exchanger 100 may include a thermal insulator 103 interposed between the first and second tanks 111 and 121 disposed side by side.

Advantageous Effects

The present invention provides the complex heat exchanger, which is provided in the secondary loop linked with the primary loop through which the refrigerant circulates, the complex heat exchanger being configured to perform the heating or cooling operation as the coolant flowing in the complex heat exchanger is heated or cooled by the refrigerant, in which in the cooling or heating mode, the coolant flows sequentially through the two heat exchangers (i.e., to exhibit an effect obtained when the two heat exchangers are connected in series) to maximize the heat exchange efficiency, and in a dehumidifying mode, the low-temperature coolant and the high-temperature coolant respectively flow through the two heat exchangers independently to smoothly implement the dehumidification, such that the single complex heat exchanger may perform the heating, cooling, and dehumidifying operations with maximum efficiency. Further, the half heating mode may be implemented when a heating load is low, such that the system efficiency may be further improved.

In particular, to implement the above-mentioned flow of the coolant, the present invention provides the optimized novel structure of the heat exchanger adopting the structure in which the two heat exchanger cores are disposed in parallel, and the path regulating manifold is provided to appropriately and selectively connect the inlet and discharge ports so that the coolant may flow sequentially through the two heat exchangers or flow through the two heat exchangers independently, such that all the heating, cooling, and dehumidifying operations may be performed. The heat exchanger structure of the present invention may also reduce a volume of the air conditioning module package, in comparison with the related art.

Further, according to the present invention, the two heat exchanger cores, which are separated from each other, may be disposed in parallel, thereby minimizing the deterioration in heat exchange efficiency at the time of using the coolants in different temperature sections. In addition, the separated structures may enable condensate water, which is produced in the cooling and dehumidifying modes, to be smoothly discharged. Furthermore, the separated structures do not require the necessity to provide a baffle or the like in the heat exchanger, which complicates the coolant path. Therefore, it is possible to further improve the ease of manufacturing.

DESCRIPTION OF REFERENCE NUMERALS

Figure 1:
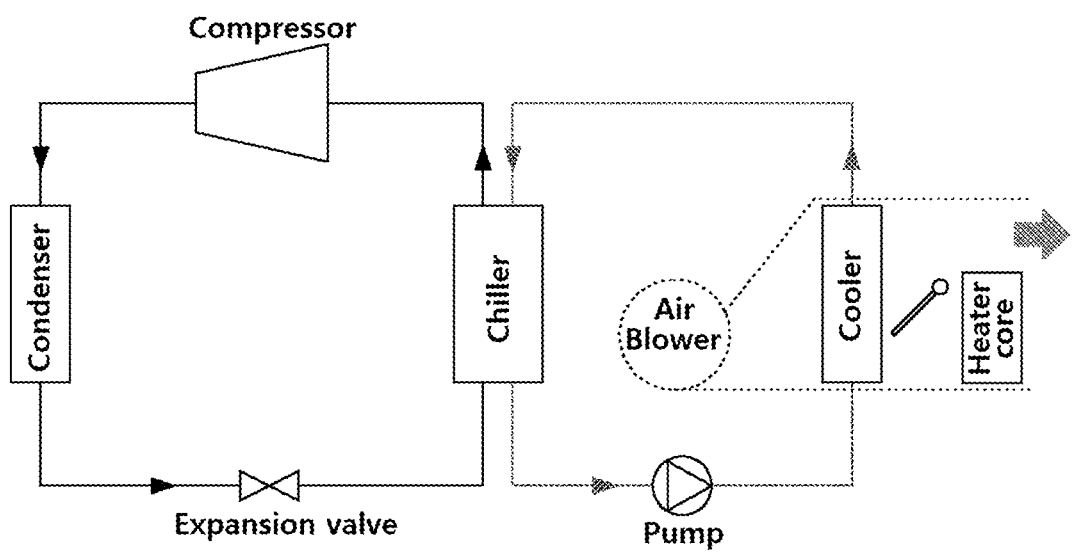
FIG. 1 is a view illustrating an embodiment of an air conditioning system having primary and secondary loops.
Figure 2:
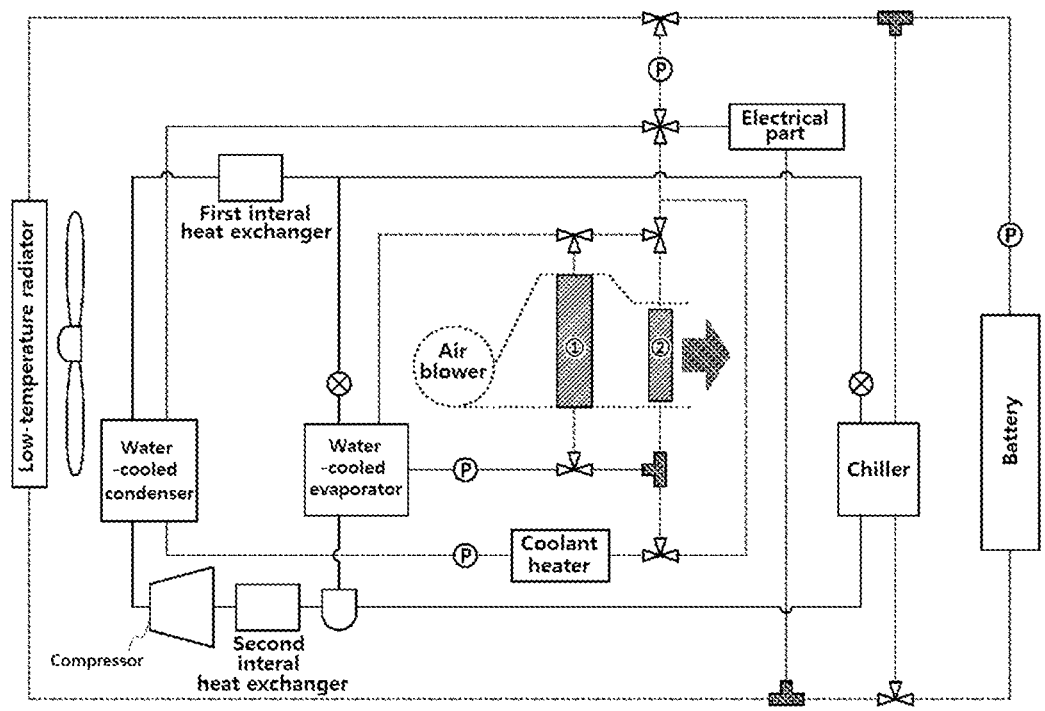
FIG. 2 is a view illustrating another embodiment of the air conditioning system having the primary and secondary loops.

100: Complex heat exchanger
101: Support
102: Connection member
103: Thermal insulator
110: First heat exchange part
111: First tank
112: First tube
113: First inlet
114: First outlet
120: Second heat exchange part
121: Second tank
122: Second tube
123: Second inlet
124: Second outlet
130: First manifold
(1): First flow path
(2): Second flow path
131: First inlet communication port
132: First outlet communication port
140: Second manifold
(3): Third flow path
(4): Fourth flow path
143: Second inlet communication port
144: Second outlet communication port

MODE FOR INVENTION

Hereinafter, a complex heat exchanger according to the present invention configured as described above will be described in detail with reference to the accompanying drawings.

As described above, a complex heat exchanger 100 of the present invention is a heat exchanger provided in a secondary loop linked with a primary loop including a compressor, a condenser, an expansion valve, and an evaporator and configured such that a refrigerant circulates therethrough. A coolant circulates through the secondary loop and exchanges heat with the refrigerant. In the related art, two independent heat exchangers are respectively configured to allow a high-temperature coolant or a low-temperature coolant to flow. The complex heat exchanger 100 of the present invention is configured by integrating the two independent heat exchangers. That is, the complex heat exchanger 100 of the present invention performs at least one air conditioning mode selected from cooling, heating, and dehumidifying modes by allowing the high-temperature coolant or the low-temperature coolant to exchange heat with outside air.

Figure 4:
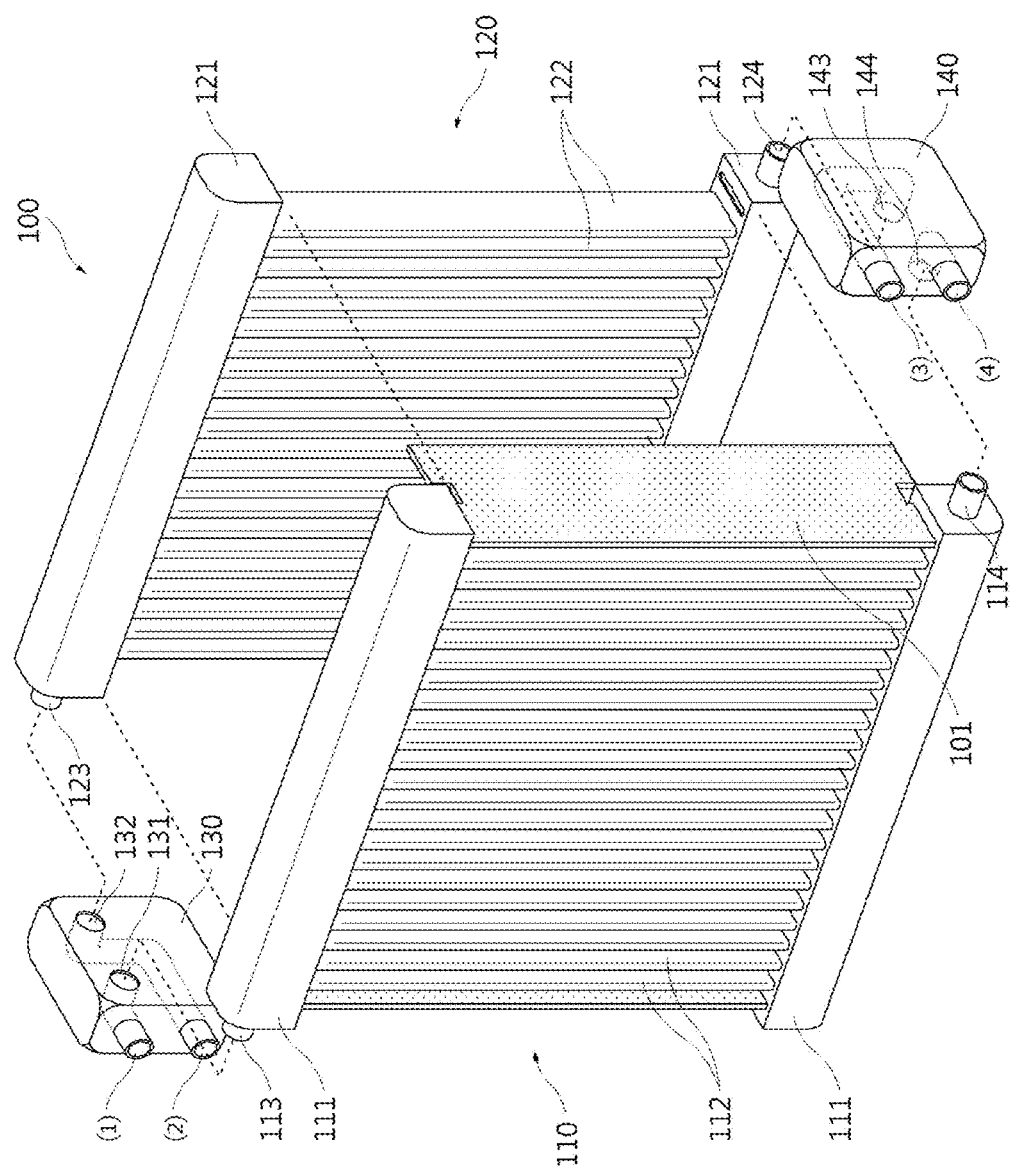
FIG. 4 is an exploded perspective view of a heat exchanger of the present invention.
Figure 5:
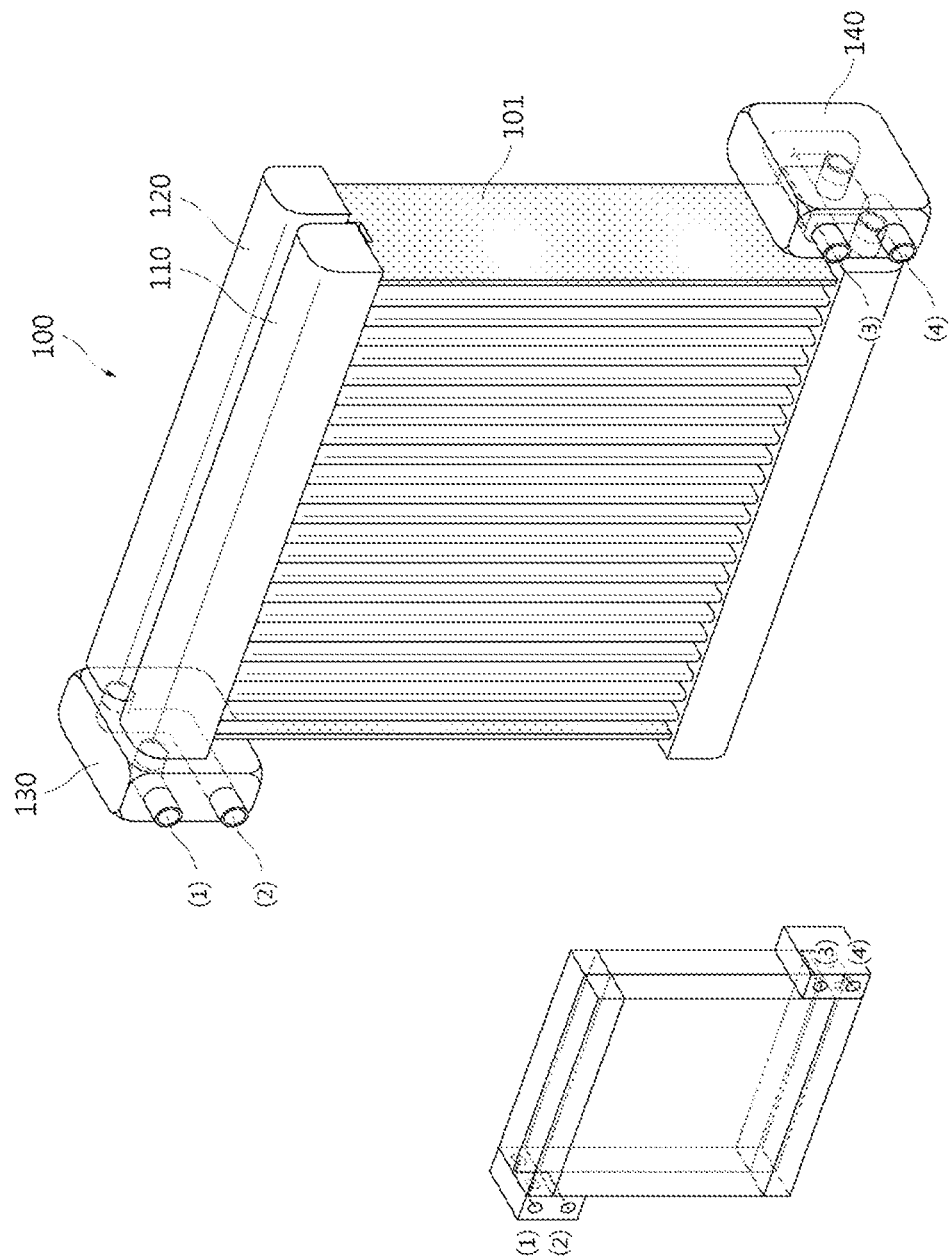
FIG. 5 is an assembled perspective view and a schematic configuration view of the heat exchanger of the present invention.

FIG. 4 is an exploded perspective view of the heat exchanger of the present invention, and FIG. 5 is an assembled perspective view and a schematic configuration view of the heat exchanger of the present invention. As illustrated in FIGS. 4 and 5, it is basically assumed that a direction in which outside air is blown inward is a forward direction, and a direction in which outside air is blown outward is a rearward direction. The complex heat exchanger 100 of the present invention is configured such that a plurality of flow ports provided on a first heat exchange part 110 and a plurality of flow ports provided on a second heat exchange part 120 disposed rearward of the first heat exchange part 110 are connected to one another. In general, two flow ports, which are an inlet port and a discharge port, are provided for each of the heat exchangers, such that the number of flow ports may be generally four. In the complex heat exchanger 100 of the present invention, the four flow ports are connected to one another as described above, such that the coolant may flow sequentially through the first heat exchange part 110 and the second heat exchange part 120, or the coolant may flow independently through the first heat exchange part 110 and the second heat exchange part 120 in accordance with introduction and discharge positions of the high-temperature coolant and the low-temperature coolant.

In other words, it can be said that in the complex heat exchanger 100 of the present invention, the first heat exchange part 110 and the second heat exchange part 120 respectively serve as two heat exchangers in the related art. In the related art, the coolants with the same temperature are supplied to the two independent heat exchangers in parallel, which limits the improvement on heat exchange performance. However, in the present invention, the connection structure is improved as described above, such that the coolant may flow through the structure provided in the form in which heat exchangers are connected in series, thereby greatly improving the heat exchange performance in comparison with the related art.

Figure 3A:
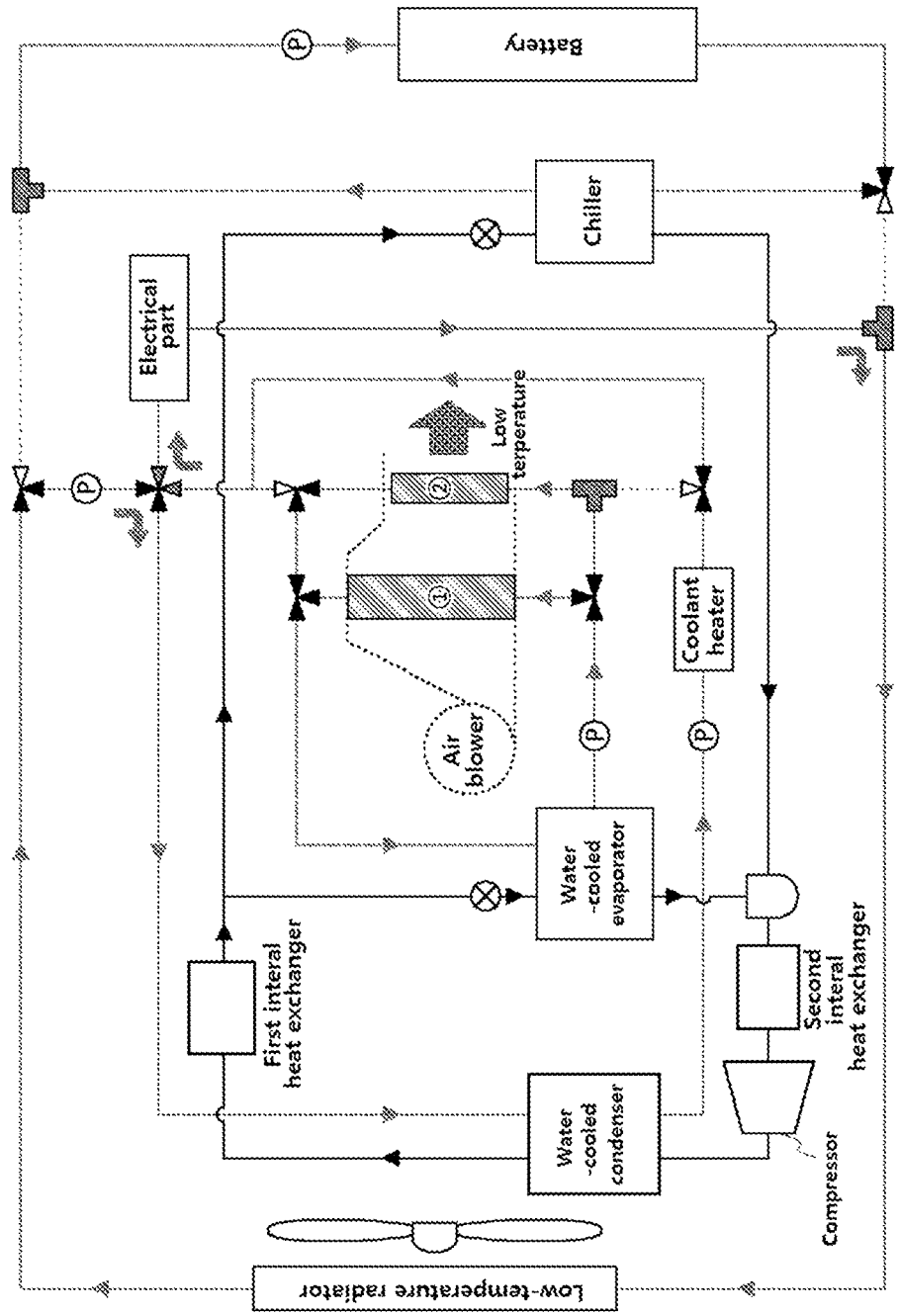
FIGS. 3A to 3C are views illustrating a refrigerant path and a coolant path when the air conditioning system in FIG. 2 performs cooling, heating, and dehumidifying operations.
Figure 3B:
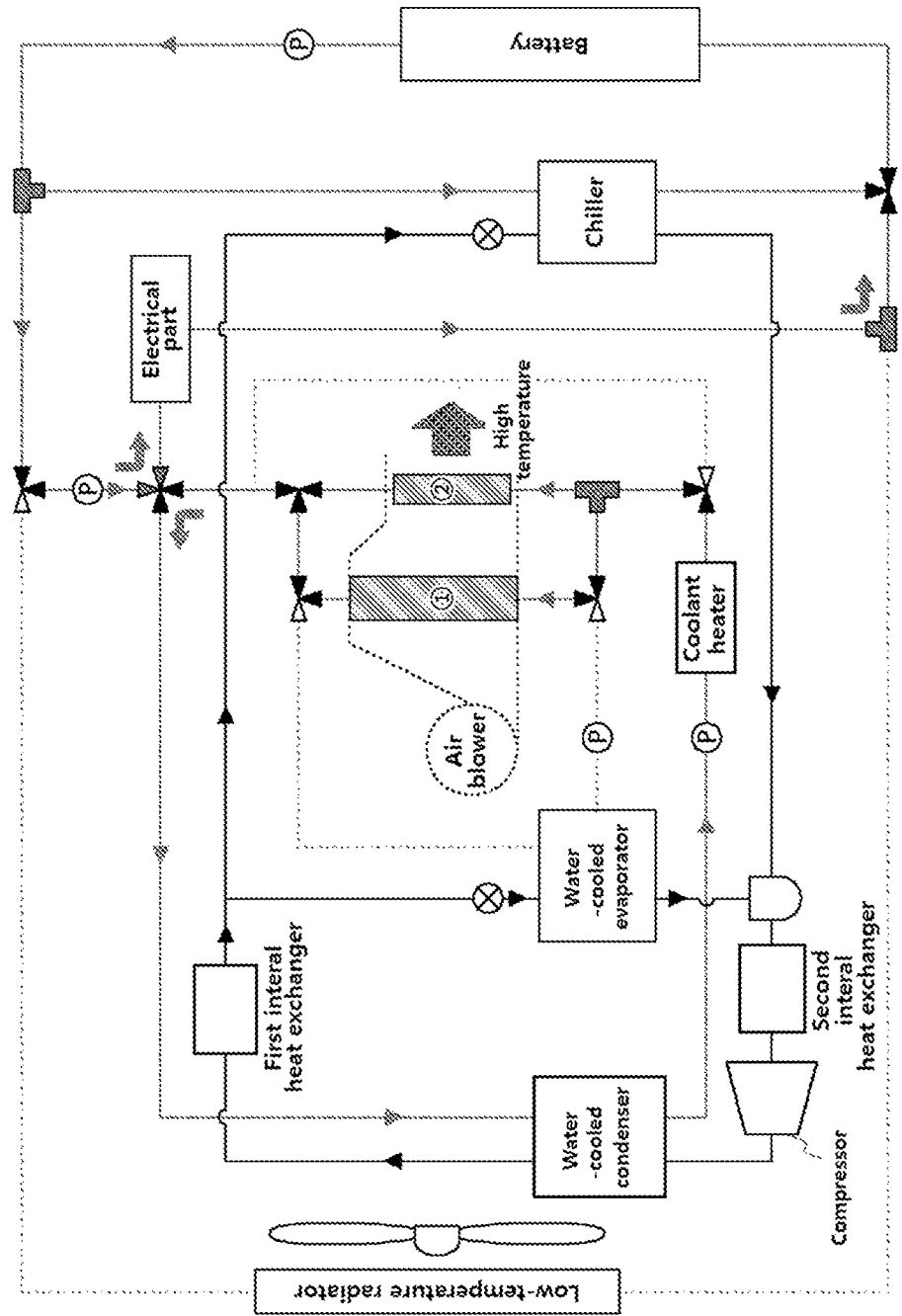
Figure 3C:
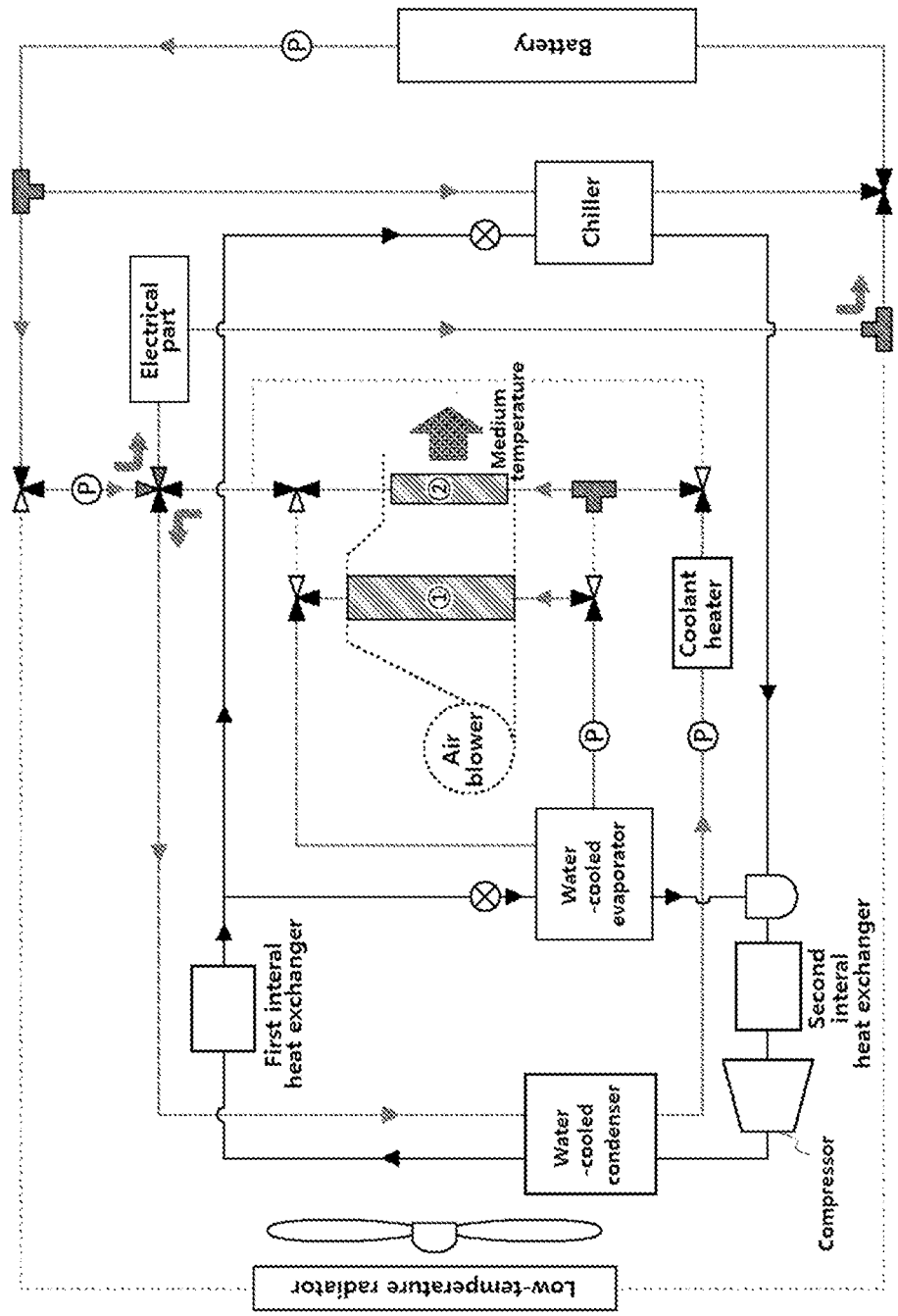

In this case, the introduction and discharge positions of the high-temperature and low-temperature coolants may be determined by external valve adjustment. As an example, as illustrated in FIGS. 3A to 3C, the complex heat exchanger 100 of the present invention may replace the first and second heat exchangers ① and ② of the air conditioning system having the primary and secondary loops. In this case, as clearly illustrated in FIGS. 3A to 3C, various valves are already present in the air conditioning system. The locations to which the high-temperature and low-temperature coolants flow may be easily determined by adjusting the valves. Even in the complex heat exchanger 100, what temperature the coolant will flow through which flow path in which air conditioning mode is predetermined in the air conditioning system pre-designed in this manner, such that the flow ports may be connected to one another in accordance with the above-mentioned configuration.

The configuration of the complex heat exchanger 100 will be described below more specifically. As described above, the complex heat exchanger 100 includes the first and second heat exchange parts 110 and 120 provided in the form of general heat exchangers. As illustrated in FIGS. 4 and 5, the complex heat exchanger 100 may include one side manifold 130 and the other side manifold 140 that appropriately connect the flow ports. The respective components will be described in more detail.

Like a configuration of a general heat exchanger, the first heat exchange part 110 includes a pair of first tanks 111 having coolant flow spaces therein, disposed side by side, and spaced apart from each other at a predetermined distance, a plurality of first tubes 112 each having two opposite ends fixed to the first tanks 111 to define coolant flow paths, one side first flow port 113 provided in one first tank 111 and configured to allow a coolant to flow, and the other side first flow port 114 provided in the other first tank 111 and configured to allow the coolant to flow. Although not illustrated in the drawings, heat radiating fins may be interposed between the first tubes 112 to improve heat exchange performance.

Like a configuration of a general heat exchanger, the second heat exchange part 120 includes a pair of second tanks 121 having coolant flow spaces therein, disposed side by side, and spaced apart from each other at a predetermined distance, a plurality of second tubes 122 each having two opposite ends fixed to the second tanks 121 to define coolant flow paths, one side second flow port 123 provided in one second tank 121 and configured to allow the coolant to flow, and the other side second flow port 124 provided in the other second tank 121 and configured to allow the coolant to flow. Although not illustrated in the drawings, heat radiating fins may be interposed between the second tubes 122 to improve heat exchange performance.

One side manifold 130 is connected to one side first flow port 113 and one side second flow port 123 provided at one side and serves to connect the first and second heat exchange parts 110 and 120 at one side. That is, a first communication port 131, which is connected to one side first flow port 113, and a second communication port 132, which is connected to one side second flow port 123, are provided in the other surface of one side manifold 130 that faces one side of each of the first and second heat exchange parts 110 and 120. In addition, a first flow path 1, which communicates with the first communication port, and a second flow path 2, which communicates with the second communication port 132, are formed in one side manifold 130 so that the coolant communication with the outside may be implemented. In the drawings, both the first flow path 1 and the second flow path 2 are illustrated as being formed at a front side of one side manifold 130. However, the arrangement position may be appropriately changed depending on configurations of flow paths of surrounding systems.

The other side manifold 140 is connected to the other side first flow port 114 and the other side second flow port 124 provided at the other side and serves to connect the first and second heat exchange parts 110 and 120 at the other side, similar to one side manifold 130. That is, a third communication port 143, which is connected to the other side first flow port 114, and a fourth communication port 144, which is connected to the other side second flow port 124, are one surface of the other side manifold 140 that faces the other side of each of the first and second heat exchange parts 110 and 120. In addition, a third flow path 3, which communicates with the third communication port 143, and a fourth flow path 4, which communicates with the fourth communication port 144, are formed in the other side manifold 130 so that the coolant communication with the outside may be implemented. In the drawings, like one side manifold 130, both the third flow path 3 and the fourth flow path 4 are illustrated as being formed at a front side of the other side manifold 140. However, the arrangement position may be appropriately changed depending on configurations of flow paths of surrounding systems.

Hereinafter, how to implement the air conditioning mode in accordance with the introduction and discharge positions of the high-temperature and low-temperature coolants will be described specifically.

Figure 6:
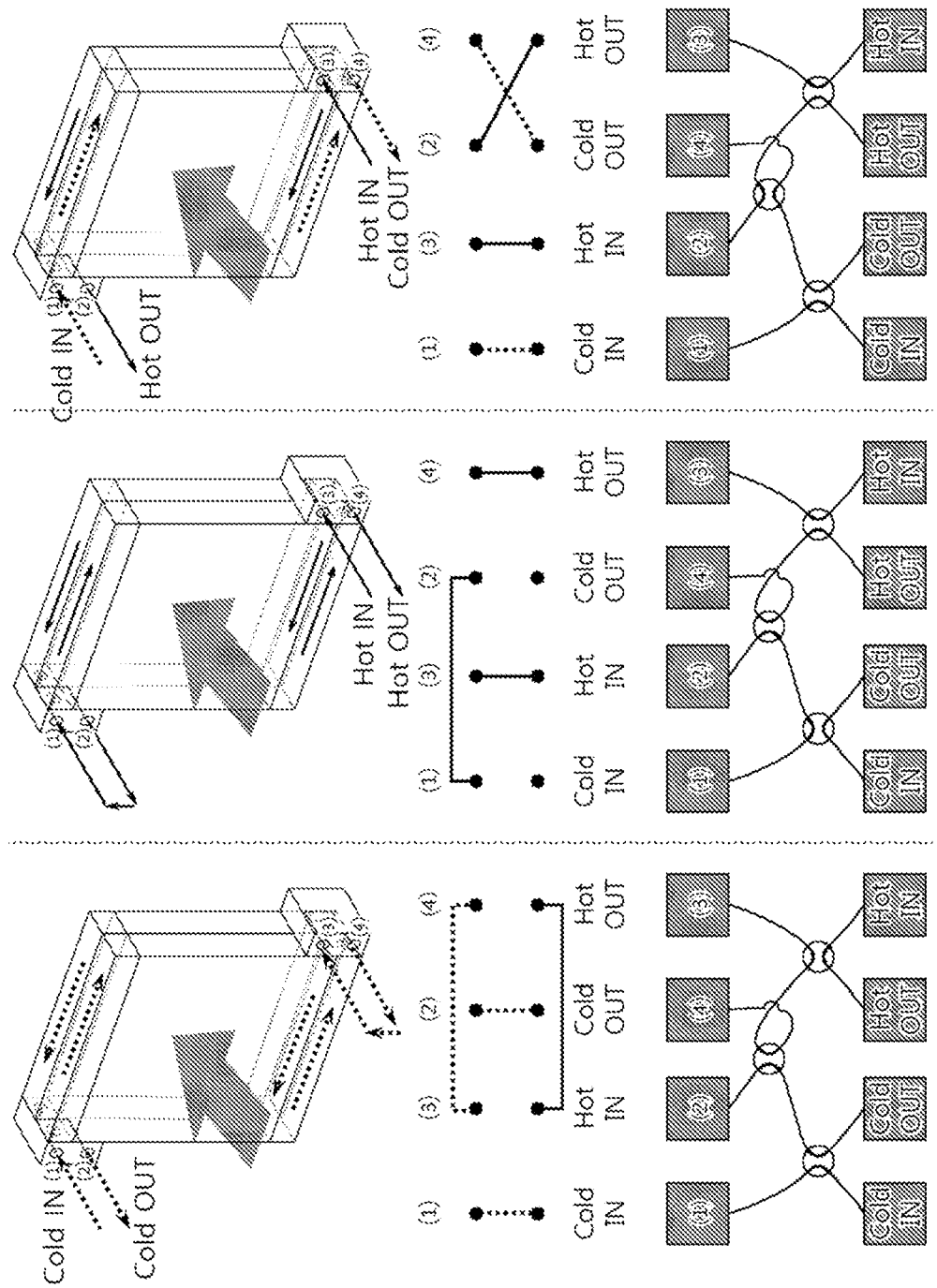
FIG. 6 is a view illustrating a first embodiment of external valve control during cooling, heating, and dehumidifying operations of the heat exchanger of the present invention.

FIG. 6 illustrates a first embodiment of external valve control during cooling, heating, and dehumidifying operations of the heat exchanger of the present invention. In FIG. 6, the left view illustrates a connection relationship between the flow of the coolant and the flow path in a cooling mode, the middle view illustrates a connection relationship between the flow of the coolant and the flow path in a heating mode, and the right view illustrates a connection relationship between the flow of the coolant and the flow path in a dehumidifying mode. In FIG. 6, at the top sides and middle sides of the left, middle and right views, the dark solid lines and dark solid arrows indicate the high-temperature coolant, and the dark dotted lines and dark dotted arrows indicate the low-temperature coolant.

In the cooling mode, the introduction (Cold IN) of the low-temperature coolant is connected to the first flow path 1, the discharge (Cold OUT) of the low-temperature coolant is connected to the second flow path 2, and the third flow path 3 and fourth flow path 4 are connected to each other at the outer side of the heat exchanger. Meanwhile, because the introduction (Hot IN) of the high-temperature coolant and the discharge (Hot OUT) of the high-temperature coolant are connected to each other at the outer side of the heat exchanger, the high-temperature coolant does not flow in the complex heat exchanger 100 of the present invention. With the above-mentioned configuration, the low-temperature coolant sequentially passes through the first flow path 1, the first communication port 131, one side first flow port 113, the first heat exchange part 110, the fourth communication port 144, the other side first flow port 114, the fourth flow path 4, the third flow path 3, the third communication port 143, the other side second flow port 124, the second heat exchange part 120, one side second flow port 123, the second communication port 132, and the second flow path 2.

That is, in the present invention, in the cooling mode, the low-temperature coolant sequentially flows through the first heat exchange part 110 and the second heat exchange part 120. In the related art, coolants with the same temperature are supplied in parallel to heat exchangers disposed at front and rear sides, which causes a problem in which heat exchange performance greatly deteriorates because a temperature difference is not large when air, which has already been cooled while passing through the heat exchanger at the front side, passes through the heat exchanger at the rear side. However, in the case of the present invention, the coolant sequentially flows through the first heat exchange part 110 and the second heat exchange part 120, such that the coolants, which respectively flow through the first heat exchange part 110 and the second heat exchange part 120, have different temperature ranges. Therefore, it is possible to further improve heat exchange performance by using this configuration in comparison with the related art.

In the heating mode, the introduction (Hot IN) of the high-temperature coolant is connected to the third flow path 3, the discharge (Hot OUT) of the high-temperature coolant is connected to the fourth flow path 4, and the first flow path 1 and second flow path 2 are connected to each other at the outer side of the heat exchanger. Meanwhile, because the introduction (Cold IN) of the low-temperature coolant and the discharge (Cold OUT) of the low-temperature coolant are connected to each other at the outer side of the heat exchanger, the low-temperature coolant does not flow in the complex heat exchanger 100 of the present invention. With the above-mentioned configuration, the high-temperature coolant sequentially passes through the third flow path 3, the third communication port 143, the other side second flow port 124, the second heat exchange part, one side second flow port 123, the second communication port 132, the second flow path 2, the first flow path 1, the first communication port 131, one side first flow port 113, the first heat exchange part 110, the fourth communication port 144, the other side first flow port 114, and the fourth flow path 4.

That is, in the present invention, in the heating mode, the high-temperature coolant sequentially flows through the second heat exchange part 120 and the first heat exchange part 110. Like the cooling mode, the coolants, which respectively flow through the first heat exchange part 110 and the second heat exchange part 120, have different temperature ranges. Therefore, it is possible to further improve heat exchange performance in comparison with the related art.

In the dehumidifying mode, the introduction (Cold IN) of the low-temperature coolant is connected to the first flow path 1, the discharge (Cold OUT) of the low-temperature coolant is connected to the fourth flow path 4, the introduction (Hot IN) of the high-temperature coolant is connected to the third flow path 3, and the discharge (Hot OUT) of the high-temperature coolant is connected to the second flow path 2. With the above-mentioned configuration, the low-temperature coolant sequentially passes through the first flow path 1, the first communication port 131, one side first flow port 113, the first heat exchange part 110, the fourth communication port 144, the other side first flow port 114, and the fourth flow path 4, and the high-temperature coolant sequentially passes through the third flow path 3, the third communication port 143, the other side second flow port 124, the second heat exchange part, one side second flow port 123, the second communication port 132, and the second flow path 2.

That is, in the present invention, in the dehumidifying mode, the low-temperature coolant passes only through the first heat exchange part 110, and the high-temperature coolant passes only through the second heat exchange part 120. Therefore, the air is cooled while passing through the first heat exchange part 110 at the front side, such that moisture in the air is condensed and removed. Further, the air is heated while passing through the second heat exchange part 120 at the rear side, such that a temperature of the air is adjusted to an appropriate temperature, and the air is blown into the vehicle interior.

Figure 7:
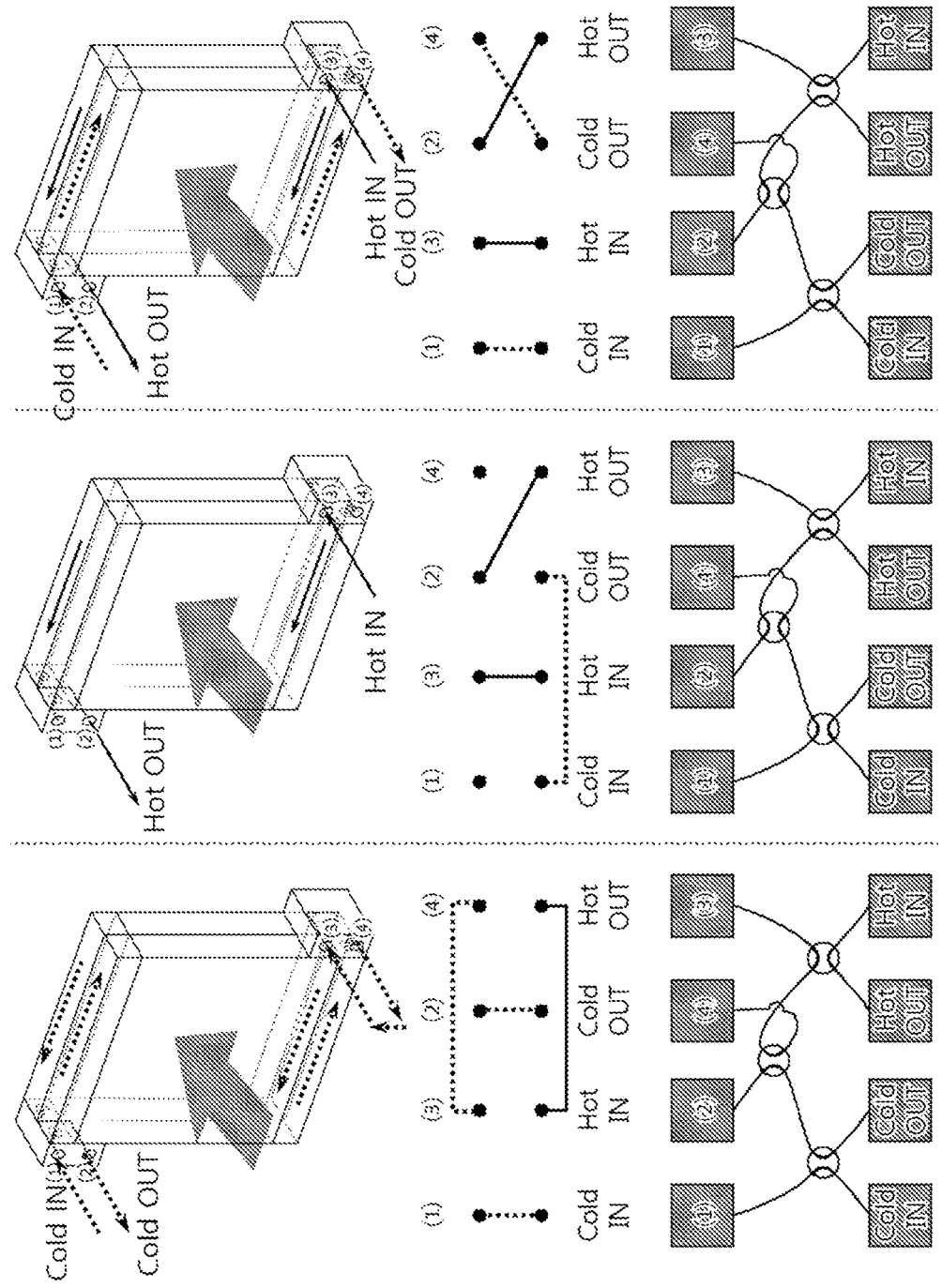
FIG. 7 is a view illustrating a second embodiment of the external valve control during the cooling, heating, and dehumidifying operations of the heat exchanger of the present invention.

FIG. 7 illustrates a second embodiment of external valve control during the cooling, heating, and dehumidifying operations of the heat exchanger of the present invention.

The cooling mode and the dehumidifying mode are identical to those in the first embodiment, but the heating mode is different from that in the first embodiment.

In the second embodiment, in the heating mode, the introduction (Hot IN) of the high-temperature coolant is connected to the third flow path 3, and the discharge (Hot OUT) of the high-temperature coolant is connected to the second flow path 2. Meanwhile, because the introduction (Cold IN) of the low-temperature coolant and the discharge (Cold OUT) of the low-temperature coolant are connected to each other at the outer side of the heat exchanger, the low-temperature coolant does not flow in the complex heat exchanger 100 of the present invention. With the above-mentioned configuration, the high-temperature coolant sequentially passes through the third flow path 3, the third communication port 143, the other side second flow port 124, the second heat exchange part, one side second flow port 123, the second communication port 132, and the second flow path 2.

That is, in the second embodiment, in the heating mode, the high-temperature coolant flows only through the second heat exchange part 120. In the first embodiment, in the heating mode, the high-temperature coolant sequentially flows through the second heat exchange part 120 and the first heat exchange part 110, such that the air is heated twice while passing through the two heat exchangers. However, in case that a heating load is not high, i.e., in case that it is not necessary to excessively heat the air, the air may be heated once while passing through the single heat exchanger without passing through the two heat exchangers. The heating mode of the second embodiment is suitable to be applied to this case. Because the heating mode performs the heating operation by using half of the heat exchanger, the heating mode may be called a half heating mode. In case that the half heating mode is used, the air is not unnecessarily excessively heated, which may improve overall system efficiency.

Figure 8A:
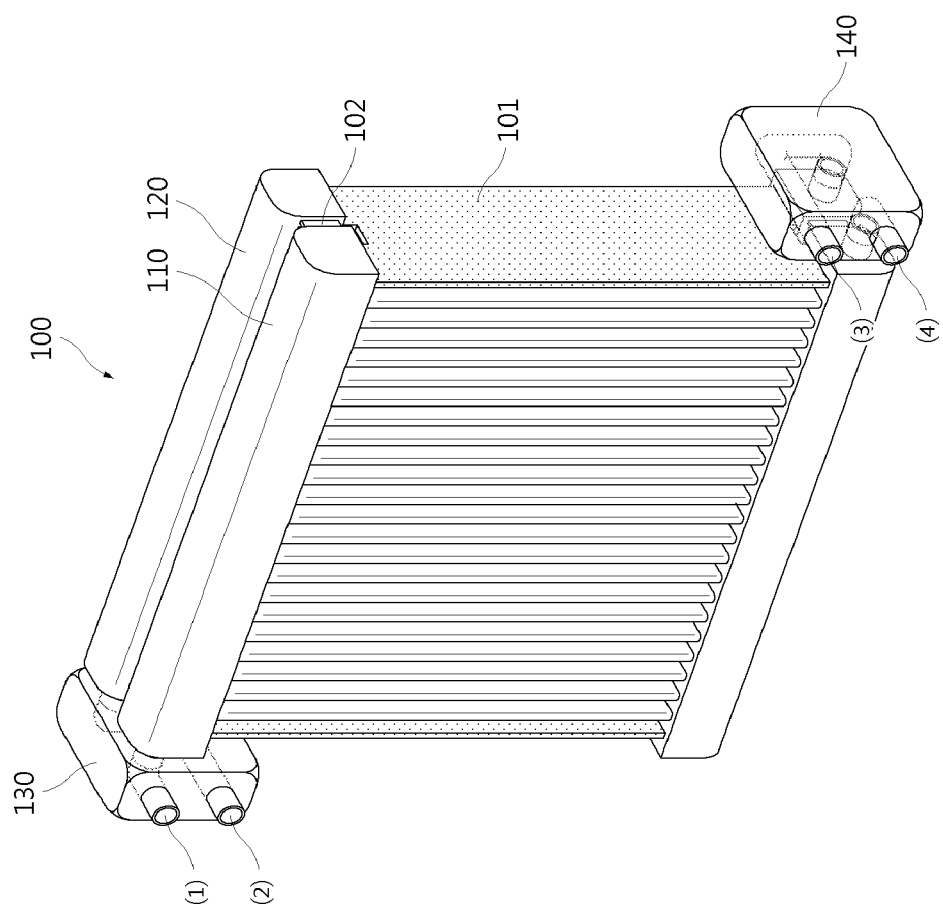
FIGS. 8A and 8B are views illustrating several embodiments of the heat exchanger of the present invention.
Figure 8B:
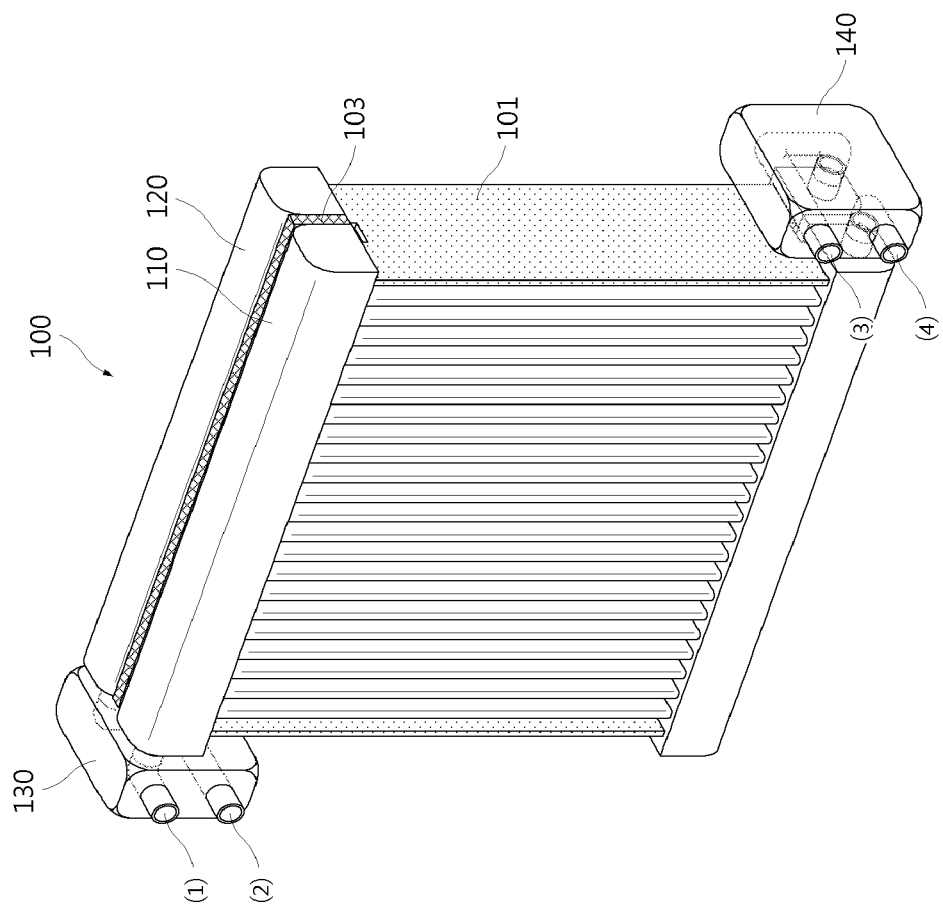

FIGS. 8A and 8B are views illustrating several embodiments of the heat exchangers of the present invention in order to explain several additional components.

As described above, in the complex heat exchanger 100 of the present invention, the flow ports of the first and second heat exchange parts 110 and 120, which are provided to be substantially identical to the two independent heat exchangers, are connected to one side manifold 130 and the other side manifold 140, such that the first and second heat exchange parts 110 and 120 are integrated with one side manifold 130 and the other side manifold 140. As described above, because the first and second heat exchange parts 110 and 120 are provided as structures separated from each other, baffles need not be provided in the heat exchangers to adjust the flow of the coolant. Therefore, there are various advantages of improving the manufacturability of the heat exchanger and smoothly discharging condensate water produced in the cooling and dehumidifying modes.

However, in case that the heat exchange parts are connected only by the manifolds as described above, there is concern that the structural rigidity deteriorates. To solve the problem, the complex heat exchanger 100 may include supports 101 each configured such that a part of a front side thereof is disposed at an end of a tube row defined by the plurality of first tubes 112, and a part of a rear side thereof is disposed at an end of the tube row defined by the plurality of first tubes 112, such that the supports 101 are disposed at two opposite ends of the tube row and connect the first tank 111 and the second tank 112. In general, the supports are provided at two opposite ends of the tube row of the heat exchanger to improve the rigidity of the heat exchanger. The support has the same external shape as the tube so that the support may be inserted into a tube insertion hole. The inside of the support is not vacant, unlike the tube. In this case, in the present invention, the supports of the first and second heat exchange parts 110 and 120 respectively disposed at the front and rear sides are integrated with each other. That is, the supports 101 may further reinforce the structural rigidity of the first and second heat exchange parts 110 and 120.

To further reinforce the structural rigidity, as illustrated in FIG. 8A, the complex heat exchanger 100 may further include a connection member 102 configured to connect the first and second tanks 111 and 121, which are disposed side by side, so that the first and second tanks 111 and 121 are integrated. In this case, it is necessary to prevent unnecessary heat transfer from being performed between the tanks through the connection member 102. Therefore, the connection member 102, which serves to connect the first tank 111 and the second tank 121, has a plurality of notches disposed in the arrangement direction of the tube rows in order to prevent heat transfer between the tanks through the connection member 102. Alternatively, as illustrated in FIG. 8A, the connection members 102 may be provided in the form of a plurality of bars separated from one another and disposed in the arrangement direction of the tube rows.

Meanwhile, in case that unnecessary heat transfer occurs between the first and second heat exchange parts 110 and 120, overall heat exchange performance naturally deteriorates. Therefore, it is preferred to completely block the heat transfer. Therefore, as illustrated in FIG. 8B, the complex heat exchanger 100 may include a thermal insulator 103 interposed between the first and second tanks 111 and 121 disposed side by side. The thermal insulator 103 may be provided to basically block unnecessary heat transfer occurring between the first and second tanks 111 and 121, thereby effectively preventing the deterioration in heat exchange performance.

The present invention is not limited to the above embodiments, and the scope of application is diverse. Of course, various modifications and implementations made by any person skilled in the art to which the present invention pertains without departing from the subject matter of the present invention claimed in the claims.

INDUSTRIAL APPLICABILITY

According to the present invention, it is possible to perform the heating, cooling, and dehumidifying operations with maximum efficiency by using the heat exchanger. Further, the half heating mode may be implemented when a heating load is low, such that the system efficiency may be further improved. In addition, the heat exchanger structure of the present invention may reduce a volume of the air conditioning module package and further improve the ease of manufacturing, in comparison with the related art.

What is claimed is:

1. A complex heat exchanger, which is provided in a secondary loop linked with a primary loop including a compressor, a condenser, an expansion valve, and an evaporator and configured such that a refrigerant circulates therethrough, the secondary loop being configured such that a coolant, which exchanges heat with the refrigerant, circulates therethrough, the complex heat exchanger being configured to perform at least one air conditioning mode selected from cooling, heating, and dehumidifying modes by allowing a first coolant or a second coolant to exchange heat with outside air, wherein a temperature of the first coolant is higher than a temperature of the second coolant, wherein when a direction in which outside air is blown inward is a forward direction and a direction in which outside air is blown outward is a rearward direction, a plurality of flow ports provided on a first heat exchange part and a plurality of flow ports provided on a second heat exchange part disposed rearward of the first heat exchange part are connected to one another, such that the coolant flows sequentially through the first heat exchange part and the second heat exchange part or the coolant flows independently through the first heat exchange part and the second heat exchange part in accordance with introduction and discharge positions of the first coolant and the second coolant, wherein a first manifold connects one side flow port of the first heat exchange part and one side flow port of the second heat exchange part, and a second manifold connects another side flow port of the first heat exchange part and another side flow port of the second heat exchange part.

2. The complex heat exchanger of claim 1, wherein the introduction and discharge positions of the first coolant and the second coolant in the complex heat exchanger are determined by external valve adjustment.

3. The complex heat exchanger of claim 1, wherein the first heat exchange part comprises:
a pair of first tanks having coolant flow spaces therein, disposed at the top and bottom of a plurality of first tubes, and spaced apart from each other at a predetermined distance;
the plurality of first tubes each having two opposite ends fixed to the first tanks to define coolant flow paths;
one side first flow port provided in one first tank and configured to allow the coolant to flow; and
another side first flow port provided in the other first tank and configured to allow the coolant to flow.

4. The complex heat exchanger of claim 3, wherein the second heat exchange part comprises:
a pair of second tanks having coolant flow spaces therein, disposed side by side at the top and bottom of a plurality of second tubes, and spaced apart from each other at a predetermined distance;
the plurality of second tubes each having two opposite ends fixed to the second tanks to define coolant flow paths;
one side second flow port provided in one second tank and configured to allow the coolant to flow; and
another side second flow port provided in the other second tank and configured to allow the coolant to flow.

5. A complex heat exchanger, which is provided in a secondary loop linked with a primary loop including a compressor, a condenser, an expansion valve, and an evaporator and configured such that a refrigerant circulates therethrough, the secondary loop being configured such that a coolant, which exchanges heat with the refrigerant, circulates therethrough, the complex heat exchanger being configured to perform at least one air conditioning mode selected from cooling, heating, and dehumidifying modes by allowing a first coolant or a second coolant to exchange heat with outside air, which a temperature of the first coolant is higher than a temperature of the second coolant, wherein when a direction in which outside air is blown inward is a forward direction and a direction in which outside air is blown outward is a rearward direction, a plurality of flow ports provided on a first heat exchange part and a plurality of flow ports provided on a second heat exchange part disposed rearward of the first heat exchange part are connected to one another, such that the coolant flows sequentially through the first heat exchange part and the second heat exchange part or the coolant flows independently through the first heat exchange part and the second heat exchange part in accordance with introduction and discharge positions of the first coolant and the second coolant, wherein the first heat exchange part comprises:
a pair of first tanks having coolant flow spaces therein and spaced apart from each other at a predetermined distance;
a plurality of first tubes each having two opposite ends fixed to the first tanks to define coolant flow paths;
one side first flow port provided in one first tank and configured to allow the coolant to flow; and
another side first flow port provided in the other first tank and configured to allow the coolant to flow, wherein the second heat exchange part comprises:
a pair of second tanks having coolant flow spaces therein and spaced apart from each other at a predetermined distance;
a plurality of second tubes each having two opposite ends fixed to the second tanks to define coolant flow paths;
one side second flow port provided in one second tank and configured to allow the coolant to flow;
another side second flow port provided in the other second tank and configured to allow the coolant to flow, and wherein the complex heat exchanger comprises:
the first heat exchange part;
the second heat exchange part;
a first manifold including a first communication port connected to one side first flow port, a first flow path (1) configured to communicate with the first communication port, a second communication port connected to one side second flow port, a second flow path (2) configured to communicate with the second communication port, one side manifold being configured to connect one side first flow port and one side second flow port;
a second manifold including a third communication port connected to the other side second flow port, a third flow path (3) configured to communicate with the third communication port, a fourth communication port connected to the other side first flow port, and a fourth flow path 4 configured to communicate with the fourth communication port, the other side manifold being configured to connect the other side first flow port and the other side second flow port.

6. The complex heat exchanger of claim 5, wherein in a cooling mode of the complex heat exchanger, the second coolant sequentially passes through the first flow path (1), the first communication port, one side first flow port, the first heat exchange part, the other side first flow port, the fourth communication port, the fourth flow path (4), the third flow path (3), the third communication port, the other side second flow port, the second heat exchange part, one side second flow port, the second communication port, and the second flow path (2), such that the second coolant sequentially flows through the first heat exchange part and the second heat exchange part.

7. The complex heat exchanger of claim 5, wherein in a heating mode of the complex heat exchanger, the first coolant sequentially passes through the third flow path (3), the third communication port, the other side second flow port, the second heat exchange part, one side second flow port, the second communication port, the second flow path (2), the first flow path (1), the first communication port, one side first flow port, the first heat exchange part, the other side first flow port, the fourth communication port, and the fourth flow path (4), such that the first coolant sequentially flows through the second heat exchange part and the first heat exchange part.

8. The complex heat exchanger of claim 5, wherein in a heating mode of the complex heat exchanger, the first coolant sequentially passes through the third flow path (3), the third communication port, the other side second flow port, the second heat exchange part, one side second flow port, the second communication port, and the second flow path (2), such that the first coolant flows only through the second heat exchange part.

9. The complex heat exchanger of claim 5, wherein in a dehumidifying mode of the complex heat exchanger, the second coolant sequentially passes through the first flow path (1), the first communication port, one side first flow port, the first heat exchange part, the other side first flow port, the fourth communication port, and the fourth flow path (4), and the first coolant sequentially passes through the third flow path (3), the third communication port, the other side second flow port, the second heat exchange part, one side second flow port, the second communication port, and the second flow path (2), such that the second coolant flows only through the first heat exchange part, and the first coolant flows only through the second heat exchange part.

10. The complex heat exchanger of claim 5, wherein the complex heat exchanger comprises supports each configured such that a part of a front side thereof is disposed at an end of a tube row defined by the plurality of first tubes, and a part of a rear side thereof is disposed at an end of the tube row defined by the plurality of first tubes, such that the supports are disposed at two opposite ends of the tube row and connect the first tank and the second tank.

11. The complex heat exchanger of claim 5, wherein the complex heat exchanger comprises a connection member configured to connect the first and second tanks so that the first and second tanks are integrated.

12. The complex heat exchanger of claim 11, wherein the connection member has a plurality of notches disposed in an arrangement direction of the tube row, or the connection member is provided in the form of a plurality of bars separated from one another and disposed in the arrangement direction of the tube row.

13. The complex heat exchanger of claim 5, wherein the complex heat exchanger comprises a thermal insulator interposed between the first and second tanks.

\* \* \* \* \*